May 8, 1951  B. G. COPPING  2,552,479
VALVE
Filed Nov. 5, 1943  3 Sheets-Sheet 3

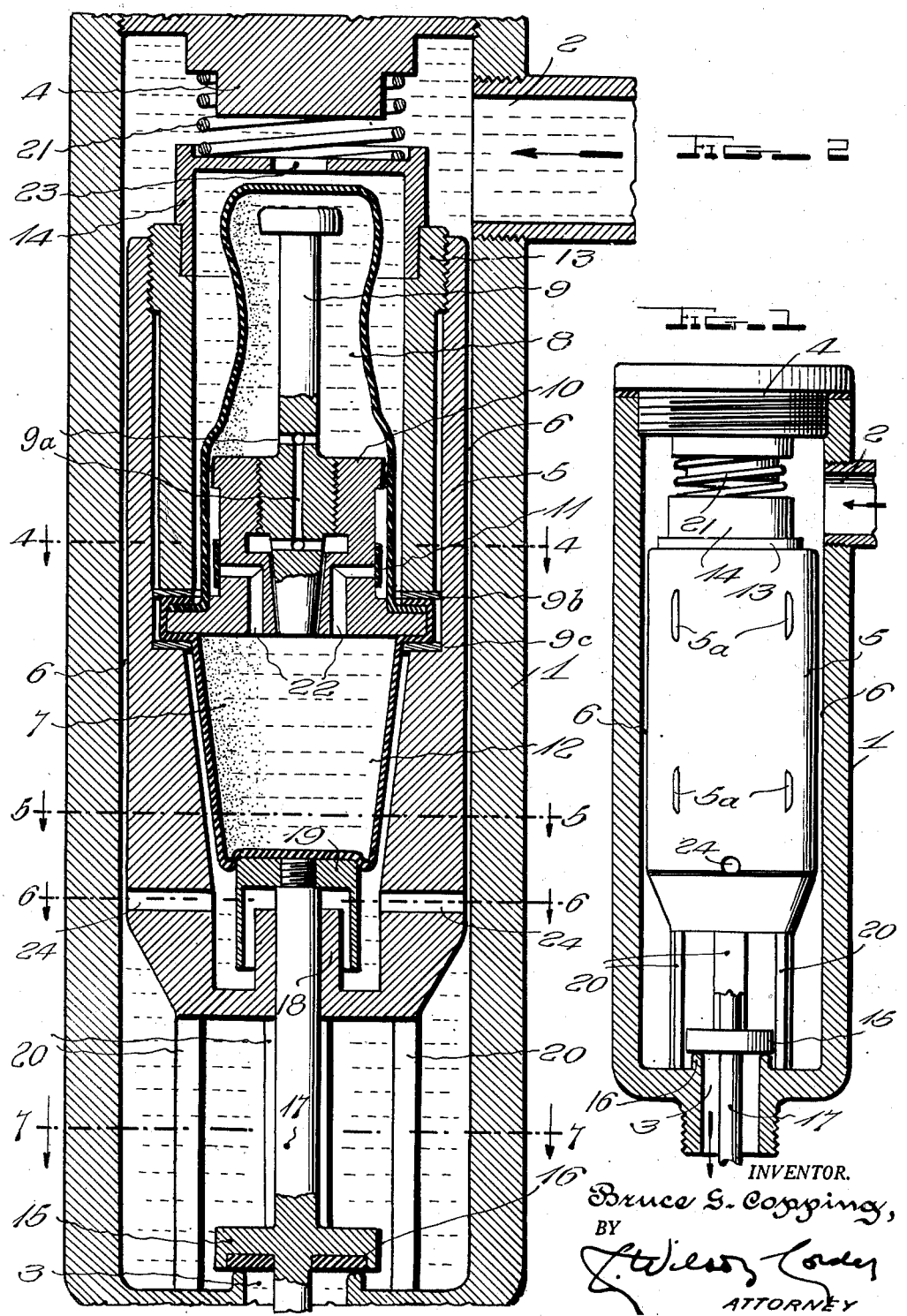

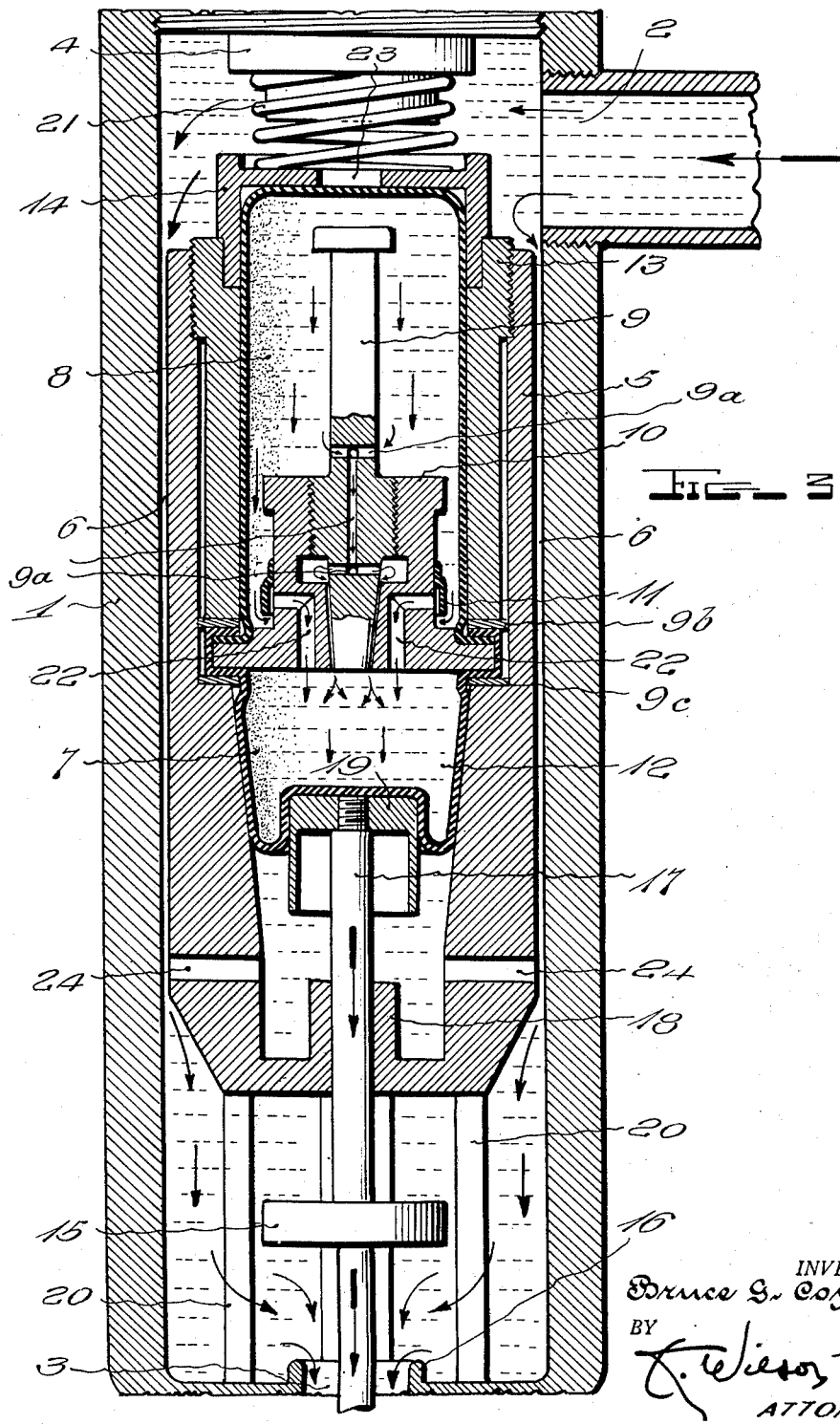

INVENTOR.
Bruce G. Copping,
BY
ATTORNEY

Patented May 8, 1951

2,552,479

UNITED STATES PATENT OFFICE 2,552,479

VALVE

Bruce G. Copping, Fulton County, Ga., assignor to The Coca-Cola Company, Wilmington, Del., a corporation of Delaware Application November 5, 1943, Serial No. 509,128

2 Claims. (Cl. 137—139)

This invention relates to valves, and more particularly to a constant-quantity device having as its function the release or transmission of a uniform predetermined amount of fluid upon each actuation, regardless of external factors such as temperature.

Heretofore, sundry mechanisms have been proposed having as their basic purpose the measuring of a given amount of fluid, conventional equipment of this type involving an electrical timing arrangement whereby through the employment of a solenoid and springs a valve is held open a given length of time, and then closed, the fluid passing through the apparatus during that time representing the measured quantity. While for many purposes such an arrangement is satisfactory, it has been found deficient in situations where an exact and precise measurement is required, and the problem becomes increasingly complicated when dealing with fluids which vary as to their viscosity, with changes in temperature, as for example, soft drink syrups which possess characteristics in this connection proverbially associated with molasses in January. Other factors, such as line and even atmospheric pressure, enter into the picture and have heretofore complicated the instant problem.

An object to this invention is to provide a constant-quantity valve which will permit the dispensing of a uniform amount of fluid under all conditions.

Another object is to provide simplicity of operation in such a device.

Another object is to provide economy of construction.

A still further object is to provide a constant-quantity valve which is positive and efficient in operation.

Another object is to provide automatic means for operating such a device.

These and other objects made apparent during the further progress of this specification are accomplished by means of the instant invention, a full and complete understanding of which is facilitated by reference to the drawings herein, in which:

Fig. 1 is a side view, partially in vertical cross-section, showing the instant valve in assembled form.

Fig. 2 is an enlarged vertical cross-sectional view of the structure illustrated in Fig. 1.

Fig. 3 is a view identical with that of Fig. 2, showing, however, the valve in discharging, instead of closed position.

Figure 4:
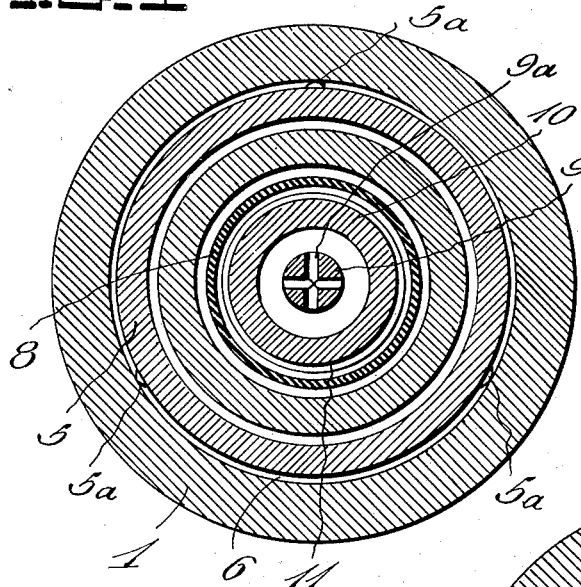
Fig. 4 is a horizontal cross-sectional view of the assembly taken along the line 4—4 in Fig. 2, looking in the direction of the arrows.
Figure 7:
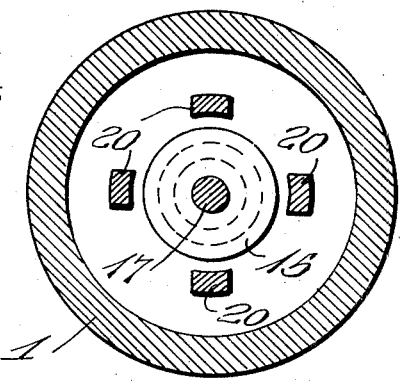
Fig. 7 is a horizontal cross-sectional view of certain internal structure taken along the line 7—7 of Fig. 2.
Figure 5:
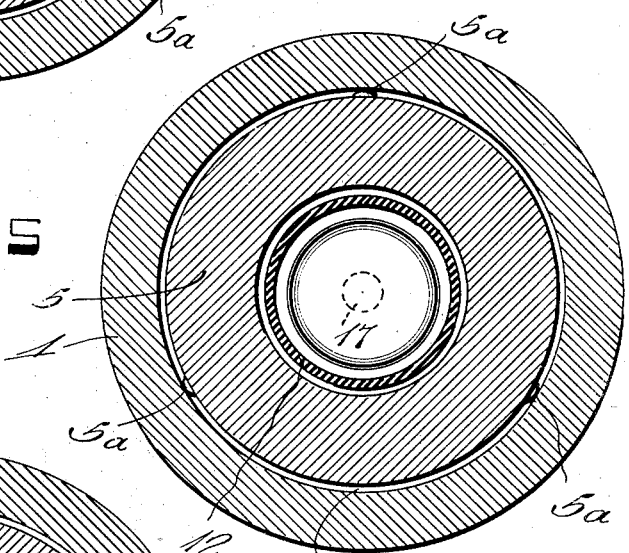
Fig. 5 is a similar horizontal cross-sectional view taken along the line 5—5 of Fig. 2.
Figure 6:
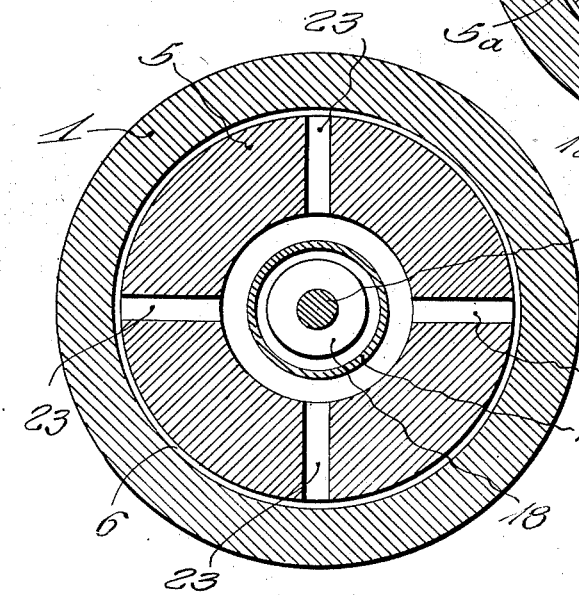
Fig. 6 is likewise a horizontal cross-sectional view taken along the line 6—6 of the figure.

Referring now to the drawings, Figs. 1 and 2, it will be seen that the instant structure comprises a cylindrically shaped main body 1, said body having an inlet opening 2 for fluid, and an outlet opening 3, and being topped by a closure cap 4. 5 is the metering unit body, which is cylindrically shaped, and preferably has an outside diameter approximately .02 of an inch less than the inside diameter of the valve body 10. 5 is positioned within 1 by means of spacing shims 5a (Figs. 4 and 5) of such thickness as to provide a uniform annular space 6 between the valve body and the metering unit body, this space in the form illustrated being approximately .01 of an inch in width.

7 represents the metering unit assembly, which consists of a rubber pressure sac 8 and a needle valve 9 having flow ducts 9a, the needle valve body 10, return check valve 11, and rubber working sac 12. The tapered lower end of needle valve 9 fits into a matching tapered hole in the valve body 10, and it will be seen that by screwing said needle valve 9 in or out of the valve body 10, the opening between the tapered end of the needle valve and the tapered hole in the body may be varied, this, in turn, governing the rate of flow of fluid from sac 8 to sac 12, which operation will be explained in detail hereafter.

The entire metering assembly is filled with water, or other suitable fluid, to the exclusion of all air, and is hermetically sealed. Metering unit 7 is clamped into metering unit body 5 by means of clamping sleeve 13, to the end of which is pressed a cap 14.

15 is a valve designed to fit on 16, the valve being carried by shaft 17, which slides through the bearing 18 in the metering unit body, and on the other end of shaft 17 is piston head 19. The entire metering assembly is positioned within the main valve body 1 by means of legs 20, and spring 21 presses the metering unit assembly firmly down so that the positioning legs are always in solid contact with the end or bottom of the main body 1.

In operation, when it is desired to start the liquid flow, the valve shaft 17, which extends outwardly through the discharge end of the valve, is forced backwardly or upwardly until the valve 15 comes into contact with the metering unit body 5, this movement causing piston head 19 to push on the working sac 12 and to eject the water therein through the ducts 22 and check valve 11, into pressure sac 8. Check valve 11 consists of a flap of rubber or other suitable material anchored at its top above 22 and extending over said duct, it being apparent that water may then flow upwardly through this passage, but in the case of any attempted return flow the flap will bear against the opening and cut same off, this representing a simple and effective check valve. Immediately the valve 15 is open, a flow of water commences (see Fig. 3), the water entering through the inlet opening 2 and passing through discharge opening 3. As a result of this flow through the annular space 6 there is a specific pressure drop; and it will be seen that the pressure sac 8, is, through hole 23, exposed to the pressure at the entering end of the annular space 6; and it will also be apparent that, by virtue of hole 24, the working sac 12 is exposed to the pressure near the discharge end of said space. Thus, there is a pressure differential attempting to force water from the pressure sac 8 through the needle valve 9 into the working sac 12, which pressure differential is proportional to the rate of flow of liquid through the annular space 6.

As a result of this pressure differential and the consequent flow of liquid from the pressure sac 8 into the working sac 12, the piston head 19, which was previously depressed, begins to advance, its advance being at a rate proportional to the transfer of the liquid from pressure sac 8 to working sac 12; and, therefore, its rate of advance may be said to be proportional to the rate of flow of liquid through the annular space 6. Because of this relationship between the rate of advance of the piston head 19—and, therefore, the valve 15 and the rate of flow of liquid through the capillary 6—the valve will always flow a certain predetermined amount of water or other fluid, and will then shut off upon valve 15 seating at 16. This holds true without regard to the pressure causing the liquid to flow, or to the back pressure against which the liquid may be flowing, since any decrease in the rate of flow through the annular space 6 will simply serve to reduce the pressure differential which forces the water from the pressure sac 8 to the working sac 12, and, therefore, reduce the rate of closing of the valve in proportion to the rate of flow of the water which it is measuring.

It will be noted that the annular space 6 and the metering passage between the needle valve 9 and the metering body 10 are so designed as to have identical hydraulic characteristics, this minimizing variations in flow at different pressures. Most liquids undergo changes in viscosity, with changes in temperature, and, as has been stated heretofore, such changes in viscosity have serious effects on the rate of flow of liquids through various metering devices of the prior art. In the instant valve, the metering unit is filled with the same liquid as it is intended to control, and by this means, the effect of temperature is largely nullified, since the liquid in the metering unit rapidly acquires the same temperature as the flowing liquid, and its viscosity becomes the same as that of the flowing liquid, which means that the rate of closing of the valve changes automatically to compensate for changes in viscosity of the flowing liquid.

While there are disclosed certain preferred embodiments of the instant invention herein, it is understood that no limitation is intended or implied thereby, but that on the contrary, the appended claims are to be accorded a construction and scope fully in keeping with the contribution to the art.

I claim:

1. In a fluid operated device including a housing having a fluid inlet, an outlet and a capillary-like passage connecting the same, metering means in said housing including interconnected closed yieldable sacs containing fluid of substantially the same characteristics as that of the fluid entering said inlet, with a first sac supported in the path of the pressure of the incoming fluid entering said inlet and a second sac supported in the path of the lesser pressure of the fluid leaving said passage, and plunger-like means movable to compress said second sac for transferring fluid therefrom to the first sac, said sacs having between them a metering opening for controlling the return of fluid to said second sac and the movement of the plunger means in proportion to the drop in pressure between said inlet and outlet.

2. In a fluid operated device including a housing having a fluid inlet, an outlet and a capillary-like passage connecting the same, metering means in said housing including interconnected closed yieldable sacs containing a fluid, with a first sac supported in the path of the pressure of the incoming fluid entering said inlet and a second sac supported in the path of the lesser pressure of the fluid leaving said passage, and plunger-like means movable to compress said second sac for transferring fluid therefrom to the first sac, said sacs having between them a metering opening for controlling the return of fluid to said second sac and the movement of the plunger means in proportion to the drop in pressure between said inlet and outlet.

BRUCE G. COPPING.

REFERENCES CITED

The following references are of record in the file of this patent:

UNITED STATES PATENTS

| Number | Name | Date |
|---|---|---|
| 270,355 | White | Jan. 9, 1883 |
| 441,045 | White | Nov. 18, 1890 |
| 729,014 | Thornton | May 26, 1903 |
| 729,965 | Schossow | June 2, 1903 |
| 781,200 | Hayden | Jan. 31, 1905 |
| 1,149,869 | Tetlow | Aug. 10, 1915 |
| 1,209,951 | Drew | Dec. 26, 1916 |
| 1,297,836 | Gulick | Mar. 18, 1919 |
| 1,513,016 | St. John | Oct. 28, 1924 |
| 1,539,323 | Neubert | May 26, 1925 |
| 1,821,988 | Rowles | Sept. 8, 1931 |
| 2,354,161 | Waterman | July 18, 1944 |

FOREIGN PATENTS

| Number | Country | Date |
|---|---|---|
| 21,766 | Great Britain | Oct. 29, 1901 |